US008646484B2

(12) United States Patent
Stroganov et al.

(10) Patent No.: US 8,646,484 B2
(45) Date of Patent: Feb. 11, 2014

(54) DEVICE FOR FLUID POWER RECUPERATION INCLUDING A GAS RECEIVER HAVING A PLURALITY OF CELLS

(76) Inventors: Alexander Anatolyevich Stroganov, St. Petersburg (RU); Leonid Olegovich Sheshin, St. Petersburg (RU)

(*) Notice: Subject to any disclaimer, the term of this patent is extended or adjusted under 35 U.S.C. 154(b) by 218 days.

(21) Appl. No.: 13/257,231

(22) PCT Filed: Feb. 9, 2010

(86) PCT No.: PCT/RU2010/000056
§ 371 (c)(1),
(2), (4) Date: Sep. 16, 2011

(87) PCT Pub. No.: WO2010/134840
PCT Pub. Date: Nov. 25, 2010

(65) Prior Publication Data

US 2012/0000560 A1 Jan. 5, 2012

(30) Foreign Application Priority Data

May 18, 2009 (RU) ................................ 2009119442

(51) Int. Cl.
*F16L 55/04* (2006.01)

(52) U.S. Cl.
USPC ................................ 138/31; 138/26; 220/592

(58) Field of Classification Search
USPC ................................ 138/26, 30, 31; 220/592
See application file for complete search history.

(56) References Cited

U.S. PATENT DOCUMENTS 2,233,804 A * 3/1941 Bourne .......................... 181/233
2,497,491 A * 2/1950 Douglas .......................... 138/30
2,676,617 A * 4/1954 Felger .......................... 138/26
3,148,745 A * 9/1964 Jones .......................... 181/233
3,212,602 A * 10/1965 Strasser et al. .......................... 181/233
4,279,697 A * 7/1981 Overhoff et al. .......................... 376/328
4,598,737 A * 7/1986 Bentley .......................... 138/30
4,865,802 A * 9/1989 Glasgow .......................... 376/307

(Continued)

FOREIGN PATENT DOCUMENTS

EP 0942194 A1 9/1999

OTHER PUBLICATIONS

Stolbov, et al.; "Fundamentals of hydraulics and hydraulic drive of machines"; Moscow; Mashinostroenie; 1988; p. 172.

(Continued)

*Primary Examiner* — Kevin P Shaver
*Assistant Examiner* — Patrick M Buechner
(74) *Attorney, Agent, or Firm* — Christopher L. Parmelee; Walker & Jocke

(57) ABSTRACT

A device for fluid power recuperation with increased efficiency and safety may be used in both stationary and mobile applications including hydraulic hybrid vehicles.
The device includes a hydropneumatic accumulator communicating via its gas port with a gas receiver. The receiver is made in the form of an aggregate of cells separated by partitions. The ratio of the receiver volume to the area of the cells internal surfaces does not exceed 0.01 m. Thermal capacity of the partitions exceed that of the gas at maximal pressure.
This improves heat exchange between the gas and the cells walls at gas compression or expansion, which increases recuperation efficiency.
A honeycomb structure where the partitions between the cells are connected with one another and the outer shell of the receiver allows making it less massive and facilitating integration of the device into the existing systems, including vehicles.

22 Claims, 11 Drawing Sheets

(56) References Cited

U.S. PATENT DOCUMENTS

Figure 1:
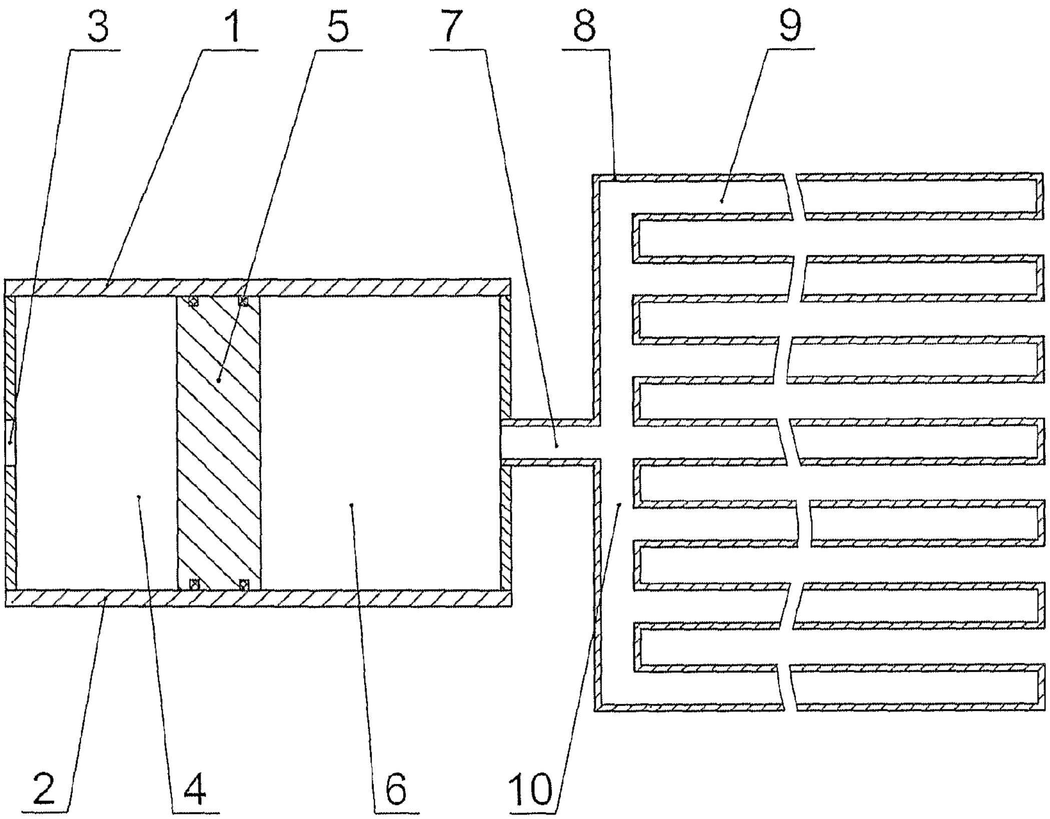

| | | | | |
|---|---|---|---|---|
| 5,709,248 | A * | 1/1998 | Goloff | 138/30 |
| 6,405,760 | B1 | 6/2002 | Tranter et al. | |
| 7,918,246 | B2 * | 4/2011 | Stroganov | 138/30 |
| 8,201,582 | B2 * | 6/2012 | Stroganov et al. | 138/31 |
| 2004/0065374 | A1 * | 4/2004 | Baltes et al. | 138/30 |
| 2005/0028879 | A1 * | 2/2005 | Suzuki | 138/26 |
| 2010/0050622 | A1 * | 3/2010 | Stroganov | 60/413 |
| 2010/0059528 | A1 * | 3/2010 | Zhevago et al. | 220/592 |
| 2010/0090381 | A1 * | 4/2010 | Stroganov et al. | 267/140.4 |
| 2013/0133853 | A1 * | 5/2013 | Stroganov et al. | 165/4 |

OTHER PUBLICATIONS

Exner, et al.; “Hydraulic drive. Fundamentals and components”; 2nd Russian edition; Bosch Report AG Service Automation Didactics; Erbach Germany; 2003; p. 156.

* cited by examiner

A-A

DEVICE FOR FLUID POWER RECUPERATION INCLUDING A GAS RECEIVER HAVING A PLURALITY OF CELLS

The invention refers to mechanical engineering and may be used for fluid power recuperation with increased efficiency and safety, including mobile applications, such as road building machines, hoisting and conveying equipment as well as hydraulic hybrid trucks and light vehicles.

STATE OF THE ART

There are known devices for fluid power recuperation in the form of hydropneumatic accumulators (hereinafter accumulators), their housing containing a variable-volume gas reservoir filled with pressurized gas via a gas port as well as a variable-volume fluid reservoir filled with fluid via a fluid port. These gas and fluid reservoirs are separated by a separator movable relative to the housing.

For fluid power recuperation accumulators are used both with a solid separator in the form of a piston and elastic separators in the form of elastic polymer membranes or cylinders [1] as well as in the form of metal bellows [2].

Before operation the gas reservoir of the accumulator is charged with pressurized gas, generally nitrogen, via the gas port up to the initial pressure from several to dozens MPa.

At power transfer from the fluid power system to the accumulator (during hydraulic hybrid vehicle braking, for example) the working fluid is pumped from the fluid power system into the accumulator and working gas is compressed in it, with gas pressure and temperature increasing. Power return from the accumulator into the fluid power system (during acceleration of the hydraulic hybrid vehicle, for example) causes expansion of the pressurized working gas and displacement of the working fluid into the fluid power system.

As a rule, the accumulator contains one gas reservoir and one fluid reservoir with equal gas and fluid pressures in them. The more fluid power is transferred to the accumulator, the higher the gas compression ratio in it. To maintain the required recuperated power the pressure growth has to be compensated by the reduced delivery of the hydraulic machine (a pump or a motor) hydraulically connected with the accumulator. As the delivery reduces, the hydraulic machine efficiency drops; hence, the recuperation efficiency integrally drops, which is a disadvantage of such devices.

An increased volume of the accumulator or an increased number of accumulators to reduce gas compression ratio raises the cost of the system, also making it heavier, which is critical for mobile applications.

A well-known device [3] is used to reduce gas compression and, at the same time, to increase the maximum possible recuperated power. The device includes a hydropneumatic accumulator, its housing containing a fluid port communicating with the fluid reservoir of the accumulator. The fluid reservoir is separated by a movable separator from the gas reservoir of the accumulator that communicates at least with one gas receiver via a gas port.

When the working fluid is forced from the fluid power system into the fluid reservoir of the accumulator, the separator is displaced and forces the gas out of the accumulator into the receiver compressing the gas in the receiver and in the accumulator. The work of pumping fluid into the accumulator is transformed into internal energy of the pressurized gas, its pressure and temperature increasing. When the power returns from the device into the fluid power system, the pressurized working gas expands and is partially forced out of the receiver into the gas reservoir of the accumulator. The separator is displaced, the volume of the fluid reservoir of the accumulator decreases and the working fluid is displaced from it into the fluid power system via the fluid port. The internal power of the pressurized gas is transformed into the work of fluid displacement, i.e. the device returns the fluid power received from the fluid power system back into the system, with the gas pressure and temperature decreasing.

Adding the receiver that is lighter and cheaper than the accumulator into the system allows to increase the amount of the recuperated power through better use of the accumulator volume and to reduce gas compression ratio and, accordingly, the variation range of the delivery of the hydraulic machines building up the system, which increases the recuperation efficiency.

A disadvantage of such devices used for fluid power recuperation is the high level of heat losses due to the fact that when compressed and expanded the gas in the receiver exchanges its heat only with the internal walls of the receiver, the distance between them for typical receiver volumes (units and dozens of liters) being too large (dozens and hundreds mm) and the gas heat conductivity being too small.

With such distances the gas heat exchange with the receiver walls is insignificant due to the gas heat conductivity. Therefore, the gas compression and expansion processes are essentially non-isothermal and there emerge considerable temperature gradients of dozens and even hundreds degrees in the receiver. Considerable temperature differentials in a large receiver volume generate convective flows increasing the heat transfer to its walls dozens and hundreds times. Therefore, the gas heated during compression in the receiver and partially in the accumulator cools down, which results in the gas pressure reduction and accumulated power losses increasing during storage of the accumulated power (for example, when the hydraulic hybrid vehicle stops). The non-equilibrium heat transfer processes in case of high temperature differentials are irreversible, i.e. the greater part of the heat transferred from the pressurized gas to the receiver walls cannot be returned to the gas during expansion. Thus, when the gas expands, the amount of the fluid power returning to the fluid power system is much less than the amount received during gas compression.

Therefore, the above described device has low efficiency of fluid power recuperation due to the high heat losses.

Another disadvantage of the device is the fact that the accumulator and the receiver are made separately in their own rugged housings, which increases the dimensions and mass of the unit.

An additional disadvantage is the fact the receivers in such devices are made with outer shells in the form of rotary bodies, which hampers their integration in densely-packed aggregates, for example, vehicles.

Another essential disadvantage of all the above described devices used in vehicles and other mobile applications is the fact that when the shell of the receiver or accumulator is damaged as a result of a traffic accident, for example, the entire pressurized gas in the receiver and accumulator may be immediately discharged into the breach with high kinetic energy, which may cause hazardous damage to the neighbouring objects and people.

Besides, even with a small breach the loss of the entire pressurized gas results in complete failure of the device, which is also a disadvantage.

ESSENCE OF THE INVENTION

The object of the present invention is creation of a device for fluid power recuperation with reduced heat losses and increased efficiency of fluid power recuperation as well as decreased kinetic energy of the gas that may be discharged in case of destruction of the outer walls of the device and higher safety when used in mobile applications.

An additional object of the present invention is ensuring performance of the device in case of partial destruction of its outer walls and, thus, ensuring its higher reliability.

Another additional task is facilitating integration of the device in various assemblies, including trucks and motor cars.

To solve the task a device for fluid power recuperation is proposed that includes at least one hydropneumatic accumulator, containing in its housing a fluid port communicating with the fluid reservoir of the accumulator separated by a movable separator from the gas reservoir of the accumulator communicating via a gas port with at least one gas receiver, wherein the receiver made in the form of aggregate of cells communicating with the gas port of the accumulator.

To improve the heat exchange the cells are preferably made in the form of narrow long channels so that the receiver volume average distance from a point in the gas to the nearest heat-exchange surface of the channel does not exceed 5 mm for the embodiments designed for recuperation with compression/expansion times of tens of seconds, and does not exceed 2 mm for the embodiments designed for recuperation with compression/expansion times of units of seconds. At that for typical cylindrical or prismatic forms of the cells, the ratio between the receiver volume and the area of the internal surfaces of the cells does not exceed 10 mm or 4 mm correspondingly. To ensure higher safety the receiver preferably comprises at least 10 cells.

Thus, in case of gas compression or expansion in the receiver the heat exchange between the gas and the cells walls occurs at reduced distances and, therefore, with smaller temperature differentials, which increases reversibility of the heat exchange processes and recuperation efficiency.

Additional reduction of the heat losses is reached when the cells are made with vorticity elements ensuring the possibility of higher turbulence of the gas flow in the cells.

The intensity of the gas heat exchange with the walls in a turbulent flow is much higher than in case of a laminar flow. The higher the recuperated power, the higher the gas flow rate through the cells and the stronger the turbulence and, hence, the heat exchange intensity.

Heat losses are further decreased by improved heat exchange in the accumulator as well: the accumulator includes a compressible regenerator in the gas reservoir that allows to decrease the distance between the heat exchange surfaces when the volume of the gas reservoir decreases and to increase the distance when the volume increases. With the maximum volume of the gas reservoir of the accumulator the average distance between the neighbouring heat exchange surfaces of the regenerator does not exceed 10 mm.

Therefore, when the gas in the accumulator compresses or expands, the heat exchange between the gas and the regenerator surfaces occurs at reduced distances and, hence, with less temperature differentials, which increases reversibility of the heat exchange processes and recuperation efficiency.

The compressible regenerator in the accumulator can be produced from a flexible foam material, for example, from a foamed elastomer. In this case the accumulator is provided with a filter allowing gas to pass from the gas reservoir of the accumulator into the receiver and entrapping the foam material while the regenerator is made with increased gas permeability near the gas port of the accumulator.

In its preferred embodiment in terms of service life and reliability the compressible regenerator of the accumulator is made from leaf, preferably metal, elements located transversely to the direction of the separator movement and dividing the gas reservoir into interconnected gas layers of variable depth, while leaf elements of the regenerator are kinematically connected with the separator allowing to increase the depth of the gas layers separated by them at the volume of the gas reservoir increase and to decrease the depth at the volume decrease.

Besides the increased service life and reliability due to better springing properties and the small relative strain of the leaf elements, this embodiment reduces considerably the risk of damage to the surrounding objects and people. In case of local damage of the shell in a traffic accident, for example, the gas is discharged into the breach creating pressure drops on the leaf elements and entraining them towards the breach, which results in formation of a package of leaf elements opposite the breach while the kinetic energy of the gas discharged into the breach drops considerably.

The receiver can be made in the form of separate cells communicating with the collector, with each cell having its own housing, which ensures maximum flexibility in choosing the cells shape and location.

To reduce the weight and heat exchange with the environment the receiver is made with common walls for adjacent cells. Such receiver has an outer shell containing a set of inner partitions dividing the interior volume of the receiver into an aggregate of cells in the form of thin tubes, so that the total thermal capacity of the partitions exceeds the gas thermal capacity at the maximum pressure, preferably exceeding 100 kJ/K/m3.

The receiver can be made with a conventional massive tough outer shell (for example, in the form of a rotary housing) made so that to withstand the maximum pressure in the receiver in case of no partitions. The set of the partitions located inside the outer shell in such embodiments performs the function of a heat-exchanger-regenerator only. In such embodiment it is technologically preferable to make the set of the partitions in the form of a springing structure allowing to be inserted into the ready outer shell of the receiver, for example, from elastic metal or polymer materials.

It is preferable to make the aggregate of the receiver cells in the form of a honeycomb structure where the partitions are connected with one another and with the outer shell of the receiver allowing to balance the gas press forces by the sum of the elastic stretching strain forces of the outer shell and partitions connected to it. Thus, taking some part of the load the partitions unload the outer shell, which allows making it less strong and massive and extends the possibility of producing receivers of various shapes and dimension ratios, thus facilitating integration of the device into existing aggregates, including vehicles.

For cells adjacent to the outer shell it is preferable to make their bounding partitions so that they could withstand without destruction the pressure drop (between the maximum pressure and the atmospheric pressure) arising in case of instantaneous outer shell seal failure, for example at a traffic accident. Thus, in case of local damage of the outer shell and puncture of one or few cells the remaining cells stay undamaged. The gas from undestroyed cells in discharged into the breach passing through the undestroyed cells, the collector and the cell adjacent to the destroyed part of the shell, which decreases its kinetic energy and destructive potential considerably.

For further reduction of the kinetic energy of the discharged gas it is preferable to emhousing flow restriction elements in the cells that restrict the gas flow at pressure drops above the chosen level exceeding the pressure drop at the maximum working rate of gas exchange between the accumulator and the receiver for at least 10 times. The flow restriction elements can be made, for example, in the form of a critical orifice. The maximum working rate of gas exchange between the accumulator and the receiver can be determined by the operating mode of the fluid power system.

For devices of common use it is preferable to choose the maximum gas exchange rate corresponding to the maximum rate of the fluid flow through the fluid port of the accumulator which is determined by the fluid port design.

Further reduction of power of the gas discharged in case of an accident and for keeping performance in case of damage of some part of the cells can be ensured by the proposed embodiment of the device including at least one emergency valve mounted on the way of the gas flow between the accumulator and a group of the cells of the receiver (or at least one cell), for example, at the inlet of the group of cells or even at the inlet of every cell and allowing blocking the gas flow through it if the pressure drop on said valve exceeds the set level preferably chosen in the range from 0.03 to 0.3 of the maximum gas pressure in the device. The emergency valves are made, for example, in the form of elastic leafs that can deform and block communication of the cell or its part with the collector if the pressure drop on it exceeds said chosen level. Such simple valves can be installed in each cell and supplemented by several separate valves with increased reliability of locking installed to lock the groups of cells for reliability improvement.

In this case the instantaneous gas discharge in case of a local damage of the outer shell resulting from a traffic accident, for example, is limited by the amount of the gas contained in one or several cells adjacent to the destroyed section of the outer shell while the gas in the other cells is kept by the partitions, that deform but preserve their integrity, and the locked emergency valves, which ensures keeping performance of the device, thus increasing its reliability, and reduces considerably the total discharge power, reducing further the risk of damage to the surrounding objects and people.

In the embodiments where the accumulator and the receiver are made separate and the gas port of the accumulator is connected with the receiver cells via a gas line, receiver port and receiver collector, for better safety said emergency valves are made to capable of separating the gas line from the gas port of the accumulator and from the receiver collector. Hence, the amount of the gas discharged in case of the line damage is limited and gas exchange between the accumulator and the receiver is prevented when either of them is damaged.

Proposed is an integral embodiment of the device where the received made in the form a honeycomb structure contains at least one accumulator, so that the receiver is the housing for the accumulator, which ensures considerably smaller dimensions and weight compared to a separate embodiment as well as higher reliability and safety due to exclusion of the vulnerable external main connecting the receiver and the accumulator and protection of the accumulator from an external destructive impact.

In the integral embodiment of the device the accumulator can be made with an elastic separator in the form of a balloon, for example.

To reduce gas leakages through the separator the accumulator should preferably have a piston separator having a sliding insulating contact with a thin-walled metal sleeve placed inside the housing in the form of a honeycomb receiver, with the gap between the metal sleeve and the receiver partitions communicating with the gas or fluid reservoir of the accumulator, and the metal sleeve being connected with the receiver so that to prevent the sleeve deformation in the zone of the sliding insulating contact with the piston at increased gas pressure preferably by connecting the metal sleeve with the receiver outside said zone. Thus, the pressures inside and outside the metal sleeve are equal while the stresses from the receiver partitions are transferred to it outside the zone of the sliding insulating contact with the piston; therefore, the sleeve is not deformed in this zone when the gas pressure changes. This allows multiple reduction of the weight of this thin-walled piston accumulator inbuilt in the receiver.

To reduce the wear of the piston seals when used in fluid power systems with high level of fluid flow ripples an embodiment is proposed where the piston contains a chamber with an elastic membrane separator dividing the piston chamber into a gas part communicating with the gas reservoir of the accumulator and a fluid part communicating with the fluid reservoir of the accumulator. In such embodiment the high-frequency ripples of the flow and the pressure cause membrane vibration when the piston does not move or moves uniformly. This ensures integrity of the piston seals and high degree of ripple smoothing.

To minimize leakages such elastic separator should be preferably made in the form of a metal bellows made from leaf elements placed transversely to the direction of the piston movement and dividing the gas part of the piston chamber into interconnected gas layers of variable depth, allowing increasing the depth of the gas layers separated by said leaf elements at increase of the volume of the gas part of the chamber and decreasing the depth of said gas layers at volume decrease. Such embodiment of the separator also ensures good heat exchange and heat regeneration in the gas part of the chamber increasing the total recuperation efficiency.

The invention is described in more detail in the examples given below and illustrated by the drawings presenting:

FIG. 1—Device for fluid power recuperation with a piston accumulator and receiver cells in the form in separate tubes, axial section.

Figure 2:
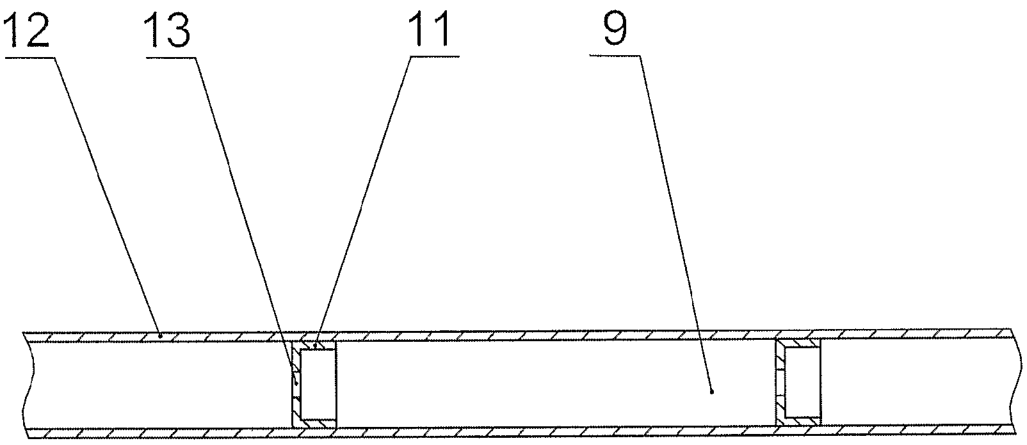

FIG. 2—Receiver cell in the form of a tube with vorticity elements, axial section.

Figure 3:
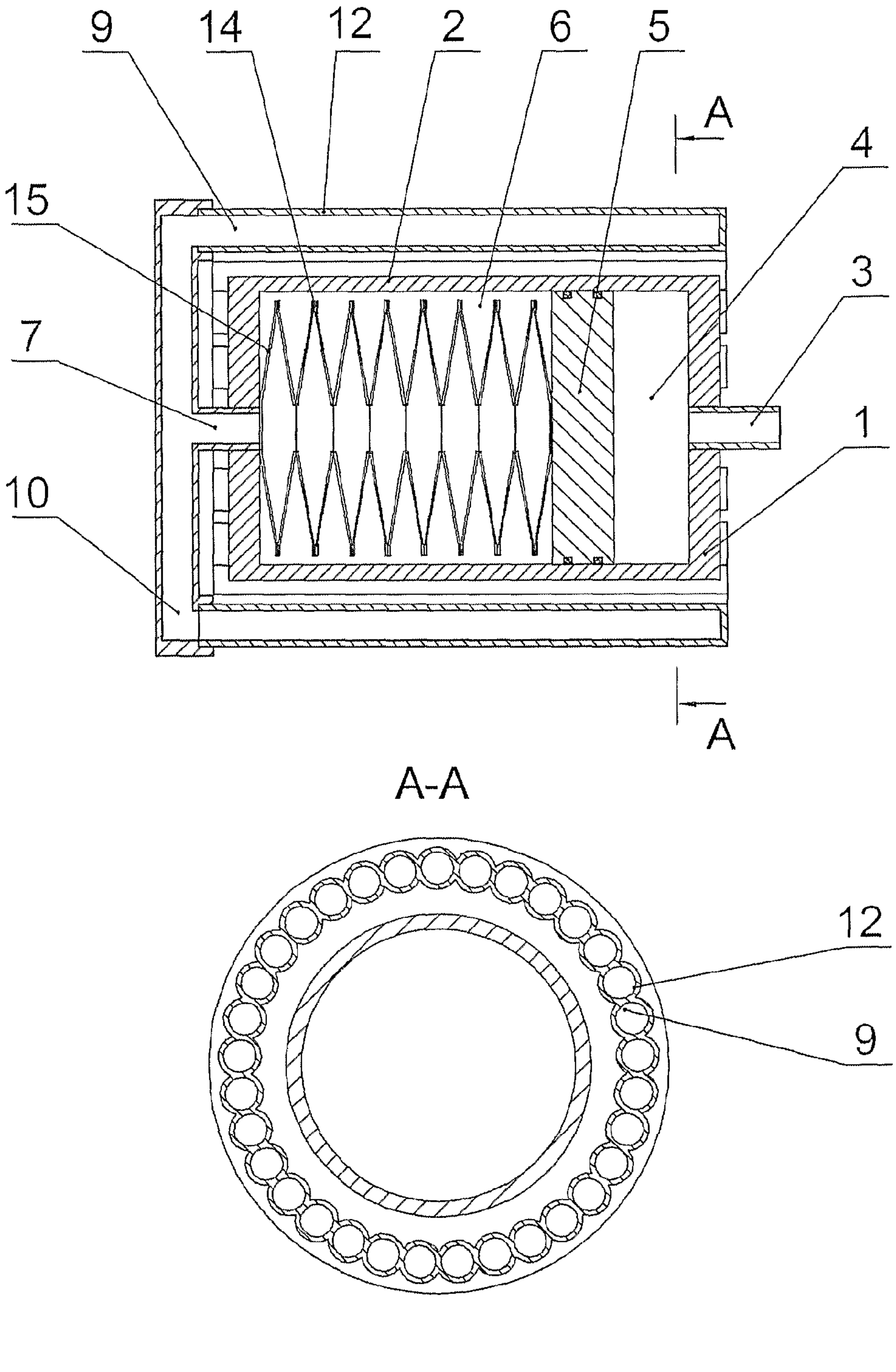

FIG. 3—Device for fluid power recuperation with a piston accumulator provided with a compressible regenerator and receiver cells in the form of tubes located over the accumulator housing, axial section and sectional view in the plane perpendicular to the axis of rotation.

Figure 4:
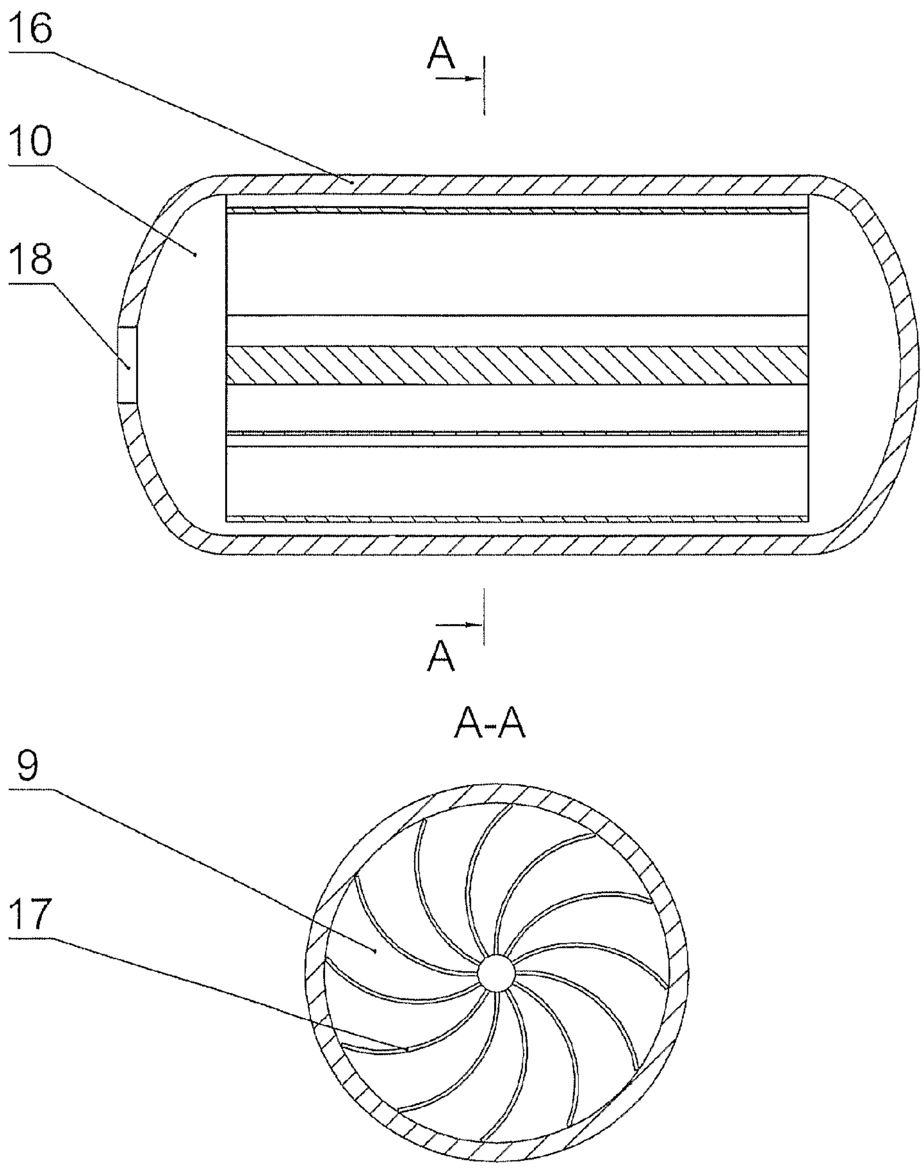

FIG. 4—Receiver with an outer shell in the form of a rotary housing and cells formed by the set of partitions made from elastic metal strips, axial section and sectional view in the plane perpendicular to the axis of rotation.

Figure 5:
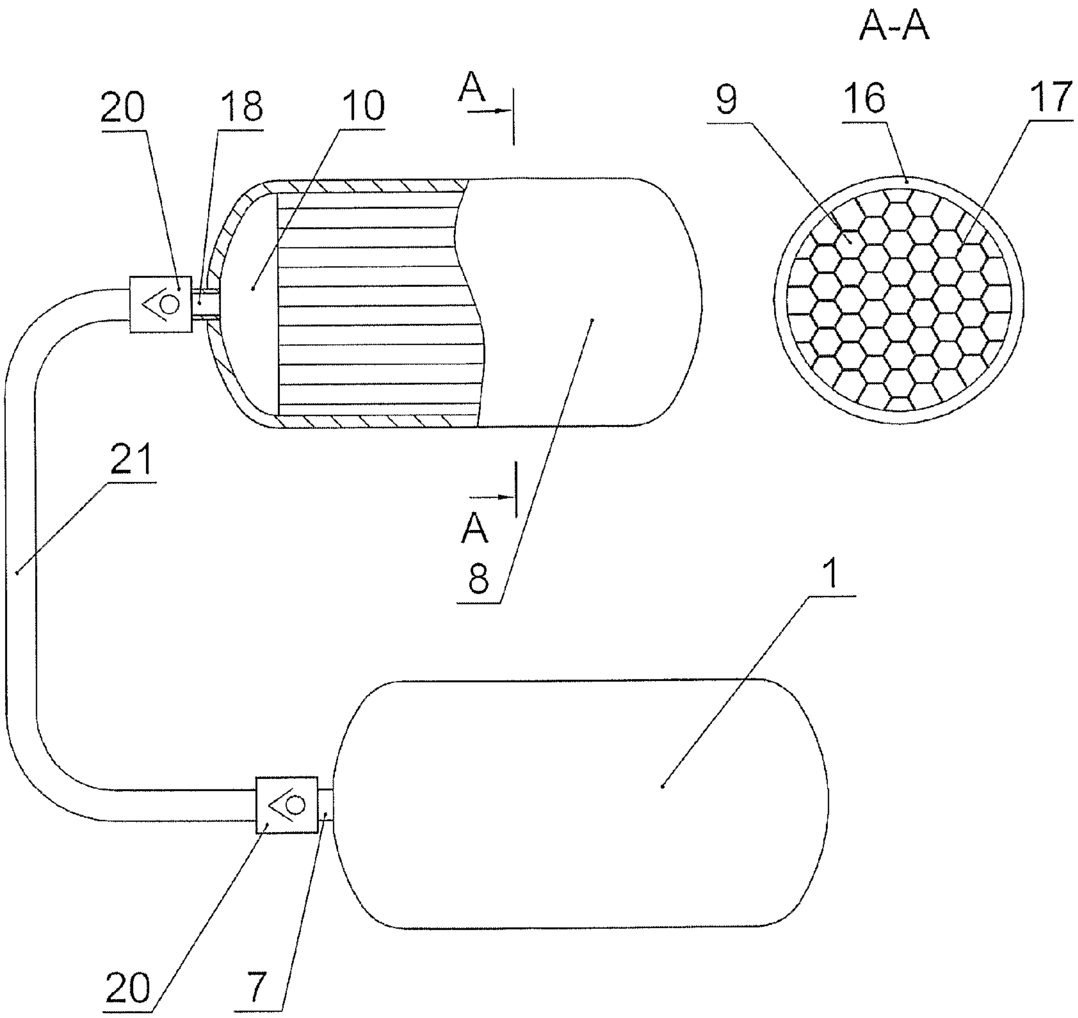

FIG. 5—Device for fluid power recuperation with an accumulator, external line and receiver with an outer shell and cells in the form of a honeycomb structure, axial section and sectional view in the plane perpendicular to the axis of rotation.

Figure 6:
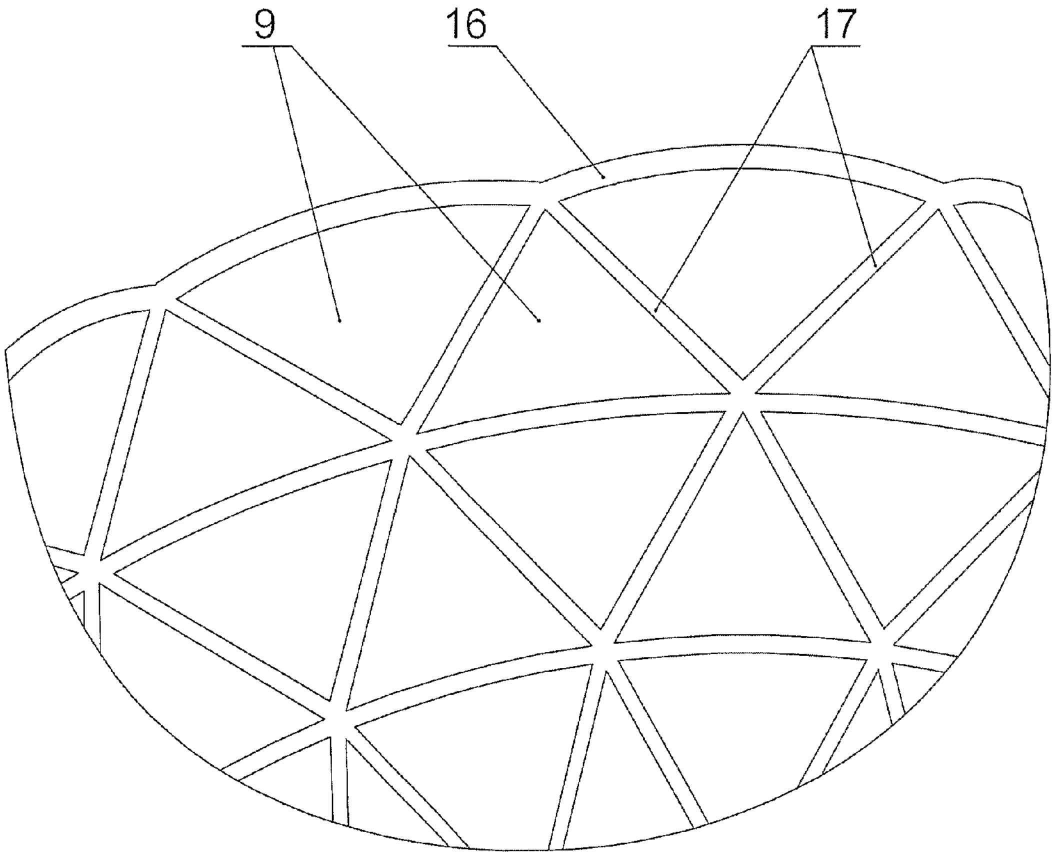

FIG. 6—Fragment of the honeycomb structure of the receiver—unstrained state of the partitions, sectional view in the plane perpendicular to the axis of rotation of the receiver.

Figure 7:
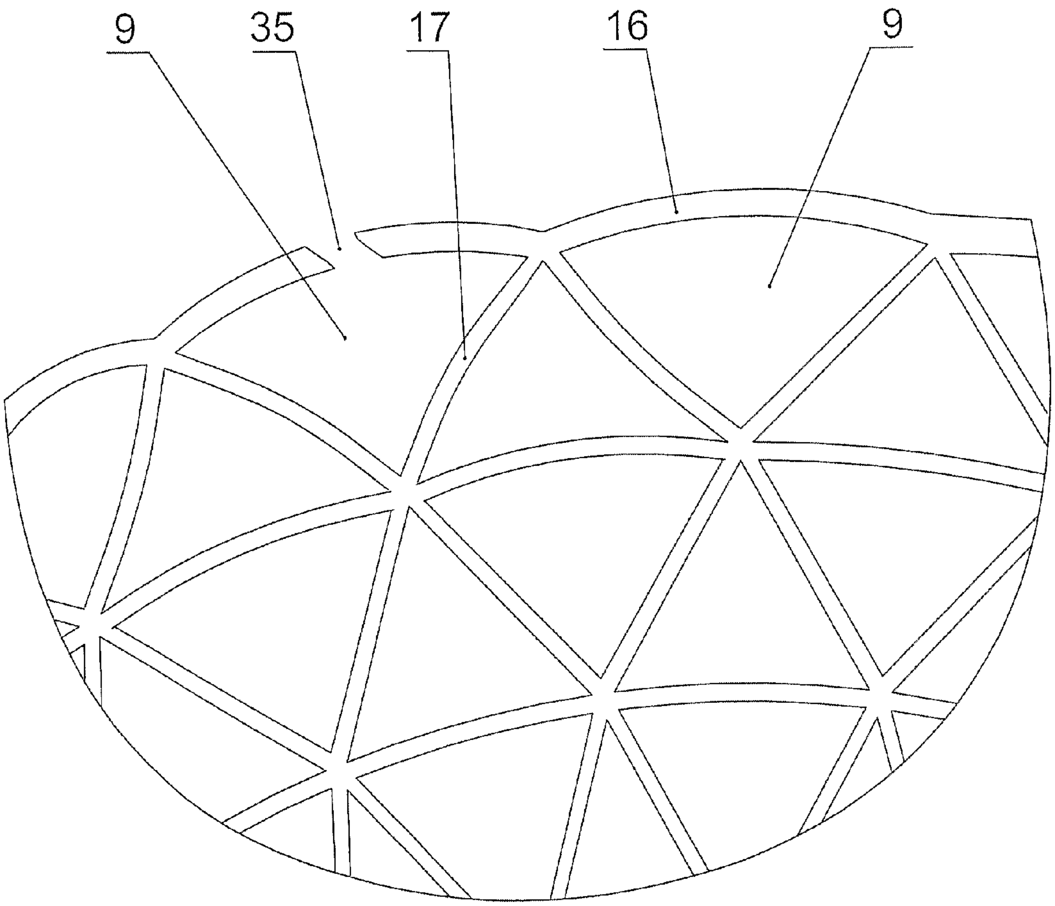

FIG. 7—Fragment of the honeycomb structure of the receiver—strained state of the partitions in case of the damaged outer shell, sectional view in the plane perpendicular to the axis of rotation of the receiver.

Figure 8:
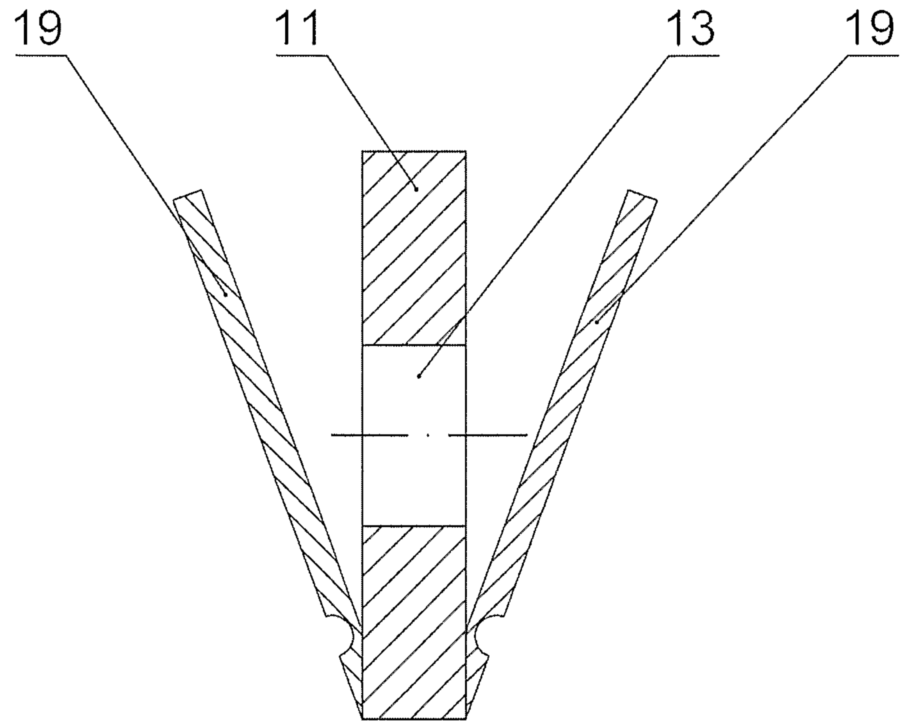

FIG. 8—Embodiment of the emergency valve, sectional view.

Figure 9:
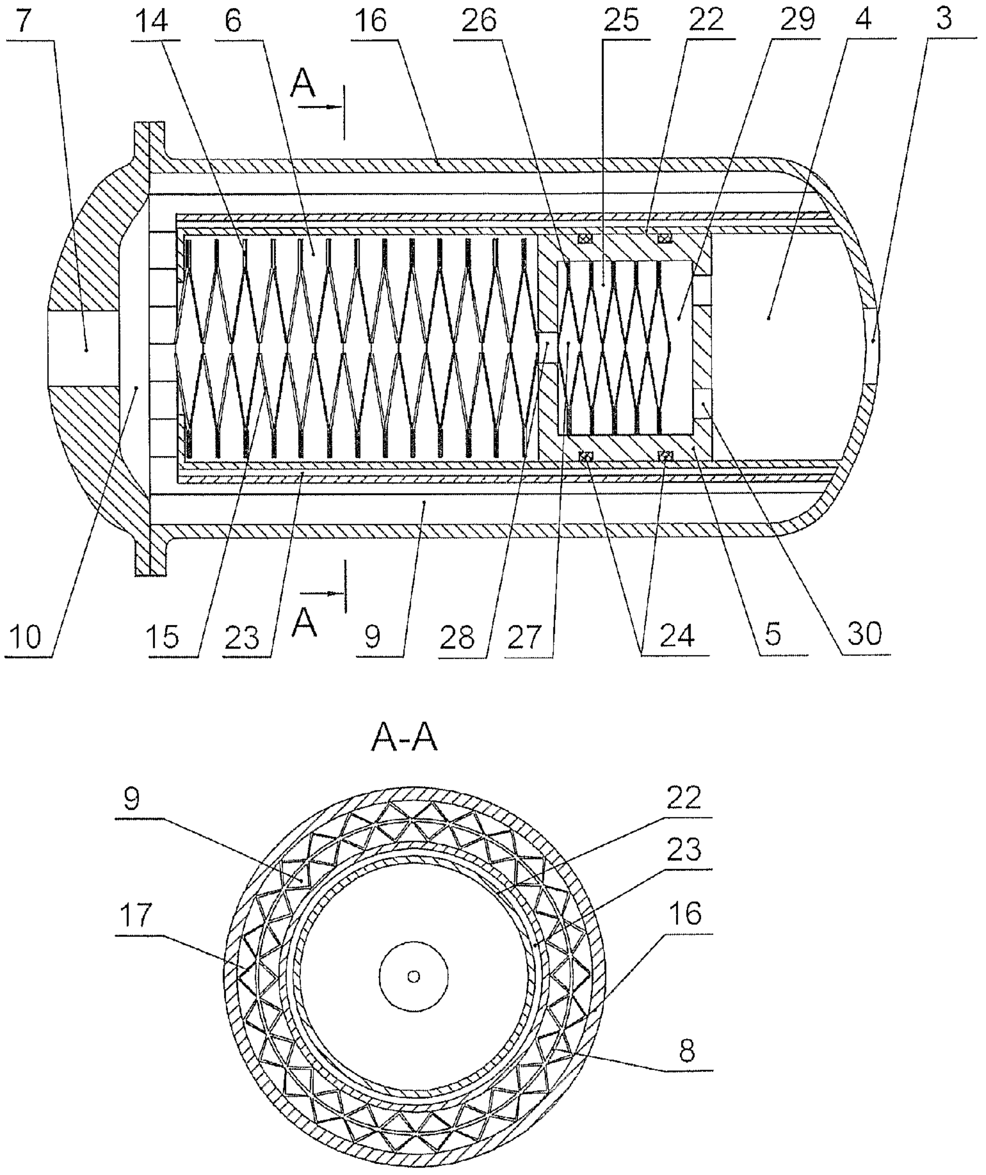

FIG. 9—Device for fluid power recuperation with a piston accumulator, piston placed in the metal sleeve inside the housing in the form of a honeycomb receiver, axial section and sectional view in the plane perpendicular to the axis of rotation of the accumulator.

Figure 10:
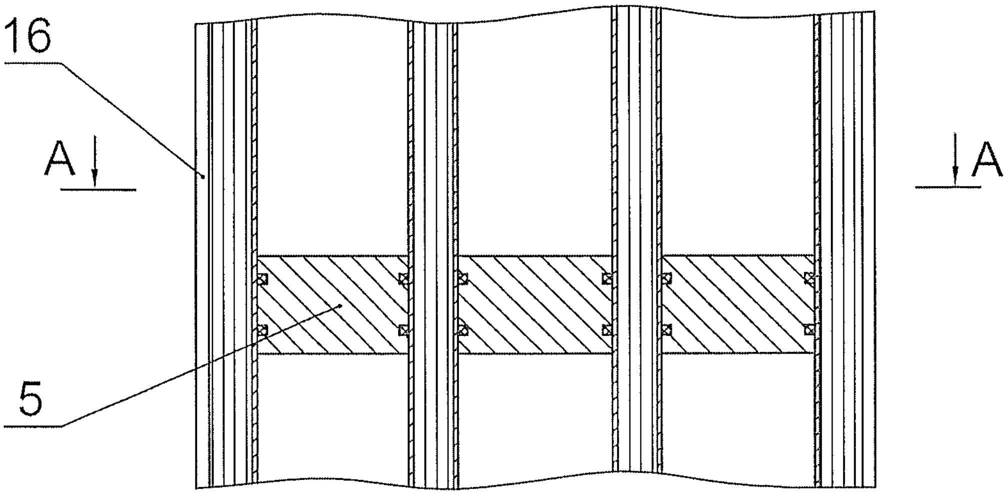
Figure 10:
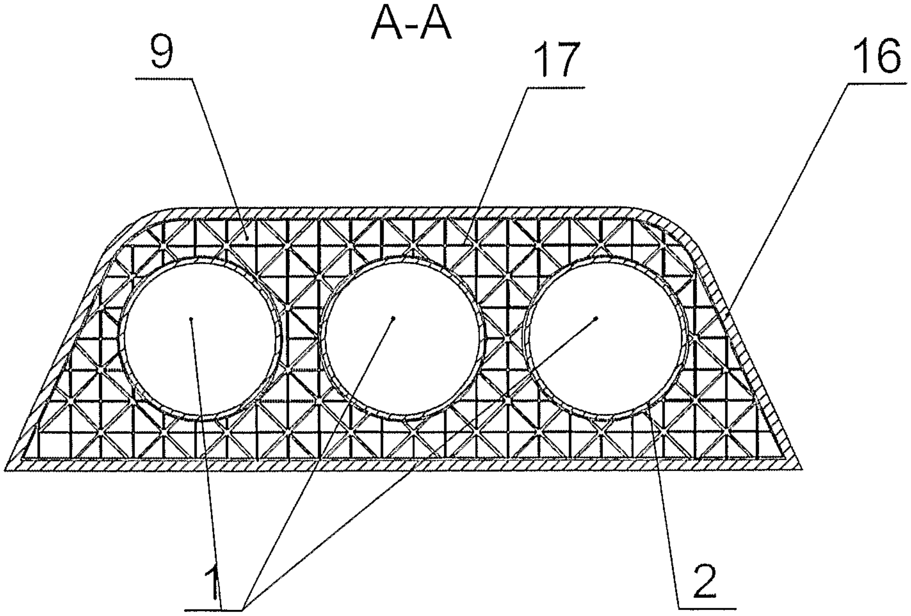

FIG. 10—Device for fluid power recuperation with three accumulators surrounded by receiver cells making the housing of the accumulators, axial section and sectional view in the plane perpendicular to the axis of rotation of the accumulators.

Figure 11:
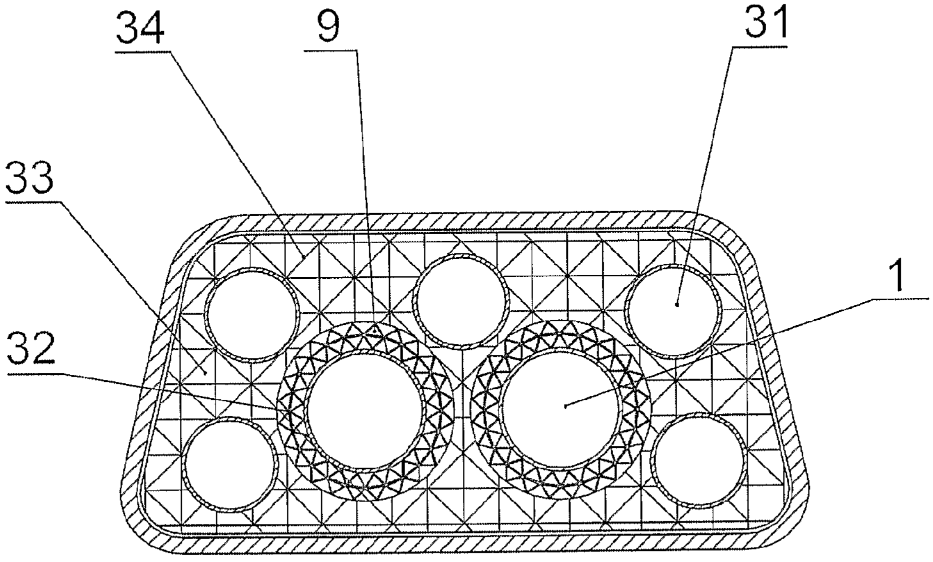

FIG. 11—Device for fluid power recuperation with two high pressure accumulators and five low pressure accumulators surrounded by receiver cells making the housing of the accumulators, sectional view in the plane perpendicular to the axis of rotation of the accumulators.

The device for fluid power recuperation in FIG. 1 includes a hydropneumatic accumulator 1, its housing 2 having the fluid port 3 communicating with the fluid reservoir 4 of the accumulator. The fluid reservoir 4 is separated by a movable separator in the form of a piston 5 (hereinafter the piston) from the gas reservoir 6 of the accumulator that communicates via the gas port 7 with the receiver 8 made as a set of cells 9 in the form of separate tubes. The cells 9 communicate with one another and with the gas port 7 of the accumulator 1 via the collector 10. To ensure good heat exchange between the gas and the walls of the cells 9 the ratio between the receiver volume and the area of internal surfaces of the cells should not exceed 10 mm for the embodiments designed for recuperation with compression/expansion times of tens of seconds, and should not exceed 2 mm for the embodiments designed for recuperation with compression/expansion times of units of seconds. For long cylindrical tubes this corresponds to the radius of the tubes of not more than 20 mm and 8 mm correspondingly.

To improve the heat exchange between the gas and the receiver cell walls the cells can be made with vorticity elements. FIG. 2 shows a cell 9 in the form of a tube with vorticity elements in the form of orifices 11 increasing the gas flow turbulence in the cell. The higher the power being recuperated, the higher the rate of the gas flow through the cell 9 and the orifice 11 and, hence, the higher the gas flow turbulence in the cell. Consequently, the intensity of the gas heat exchange with the walls 12 of the cell 9 is also higher. The diameter of the holes 13 in orifices 11 and the number of orifices are chosen on the basis of the maximum gas pressure in the receiver and the working range of rates of the gas flow between the receiver and the accumulator.

Heat losses in recuperation are further reduced by improved heat exchange in the accumulator as well. The device in FIG. 3 includes a hydropneumatic accumulator 1 with a compressible regenerator 14 mounted in its gas reservoir 6 in the form of a multilayer spring made of metal leaf elements 15 placed transversely to the separator movement, so that the distance between the heat exchange surfaces of the leaf elements 15 decreases at the volume of the gas reservoir 6 decrease and increases at the volume increase. The number of leaf elements 15 is chosen so that in case of the maximum volume of the gas reservoir 6 the average distance between the neighbouring heat exchange surfaces of the compressible regenerator 14 should not exceed 10 mm for the embodiments designed for recuperation with compression/expansion times of tens of seconds, and does not exceed 3 mm for the embodiments designed for recuperation with compression/expansion times of units of seconds. In the embodiments preferable cost wise the compressible regenerator of the accumulator can be made from a flexible foam material, a foam elastomer, for example. A combined embodiment is also possible where spacers made from a flexible foam material are placed between the metal leaf elements of the compressible regenerator. Such embodiment has the least heat losses in the accumulator.

The receivers in FIG. 4, FIG. 5, FIG. 9-FIG. 11 are made with common walls for adjacent cells. The receiver 8 in FIG. 5 has an outer shell 16 with a set of partitions 17 made inside it breaking the internal volume of the receiver into an aggregate of cells 9 in the form of thin tubes. The thickness and number of the partitions 17 are chosen so that their total thermal capacity exceeds the thermal capacity of the gas in the receiver at the maximum pressure.

In the embodiment preferred in terms of manufacturability the receiver in FIG. 4 has an outer shell 16 in the form of a rotary body, with a set of partitions 17 placed inside it. The outer shell 16 is designed for the maximum pressure in the receiver without partitions and performs in such receiver the function of the heat-exchanging regenerator only. The partitions 17 are made from elastic metal or polymer strips coiled into a multilayer spiral spring for convenient inserting into the outer shell 16 of the receiver via its port 18.

The set of the cells with common walls for adjacent cells in the receivers in FIG. 5, FIG. 9-FIG. 11 is made in the form of a honeycomb structure where the partitions 17 are connected with one another and with the outer shell 16 so that they are capable of extending when the gas pressure in the receiver increases.

Since the partitions 17 in the honeycomb structure take some part of the load unloading the outer shell 16 of the receiver, the latter can be less thick and massive, which extends the possibilities of manufacturing receivers of various shapes and dimension ratios.

FIG. 5 shows a receiver with the outer shell 16 in the form of a rotary body filled with partitions 17 in the form of a honeycomb structure. The partitions of the cells adjacent to the outer shell 16 of the receiver are preferably made capable of withstanding without destruction the pressure drop (between the maximum operating pressure and the atmospheric pressure) in case of instantaneous seal failure of outer shell 16 or any neighbouring cell 9.

FIG. 6 and FIG. 7 show fragments of the honeycomb structure with undamaged (FIG. 6) partitions 17 adjacent to the outer shell 16 and their strained state in FIG. 7 in case of the damaged outer shell 16. The configuration of the partitions 17 of the honeycomb structure, their material and thickness are chosen so that in case of local destructions of the outer shell 16 the partitions 17 deform but keep their integrity. The type of the damage in FIG. 7 chosen for finite element modeling corresponds to the breach of the outer shell 16 in one cell 9. For better visualization all strains in FIG. 6 and FIG. 7 are multiply magnified. Thus, the gas from the accumulator and undestroyed cells is discharged into the breach 35 overcoming the resistance of the honeycomb structure and the collector, which reduces considerably its kinetic energy and destructive potential.

For further reduction of kinetic energy of the gas discharged in case of the damaged outer shell 16 it is preferable to make flow restriction elements in the cells 9. FIG. 2 shows the cell 9 in the form of a tube with orifices 11. The orifices 11 are embodied as critical orifices and function as vorticity elements at working rates of gas exchanges between the accumulator and the receiver. At pressure drops on the orifices 11 above the chosen level exceeding at least 10 times the pressure drop at the maximum working rates of gas compression and expansion in the device the orifices 11 perform the function of flow restricting elements.

To maintain the performance of the device in case of partially damaged outer shell it is preferable to equip the receiver collector or its cells with emergency valves locking the cell or its part where the pressure dropped sharply relative to the pressure on the other side of the valve. FIG. 8 shows embodiment of a bidirectional emergency valve in the form of orifice 11, also performing the function of a vorticity element, and elastic leafs 19. The elastic leafs 19 are capable of deforming and closing the hole 13 of the orifice 11 thus blocking communication between the cell or its part with the collector at increased pressure drop on the orifice 11 up to the chosen level which exceeds at least 10 times the pressure drop on it at the maximum working rate of gas compression and expansion in the device. The maximum working rate of gas exchange between the accumulator and receiver can be determined by the operating mode of the fluid power system. For common use devices it is preferable to provide the emergency valve locking at the pressure drop on it exceeding the set level preferably chosen in the range from 0.03 to 0.3 of the maximum gas pressure in the device.

For better safety in FIG. 5 the gas port 7 of the accumulator 1 and port 18 of the receiver 8 include emergency valves 20 locking in case of a sharp pressure drop in the gas line 21 connecting the accumulator 1 with the receiver 8. This restricts the amount of the gas discharged in case of the damaged line 21 and prevents gas exchange between the accumulator 1 and the receiver 8 if either of them is damaged.

FIG. 9 shows the preferred accumulator in terms of gas losses minimization, its piston 5 having a sliding insulating contact with a thin-walled metal sleeve 22 placed inside the receiver 8 in the form of a honeycomb structure. The gap 23 between the metal sleeve 22 and the partitions 17 of the receiver 8 communicates with the gas reservoir 6 of the accumulator. The pressures in the accumulator, cells 9 of the receiver 8 connected with it and the gap are equal, which ensures preserved shape of the sleeve 22 and the quality of the seal between it and the piston 5. Thus, the deforming impacts from the walls of the cells 9 of the receiver 8, subject to extension at gas pressure increase, are applied outside the seal area while deformation of the sleeve 22 in the zone of the sliding insulating contact with the piston 5 is prevented. To reduce the wear of the seals 24 of the piston 5 when used in fluid power systems with high level of fluid flow ripples the piston 5 contains chamber 25 with an elastic membrane separator in the form of lightweight bellows 26 dividing the chamber 25 in the piston 5 into the gas part 27 communicating with the gas reservoir 6 of the accumulator through windows 28 and the fluid part 29 communicating with the fluid reservoir 4 of the accumulator through windows 30. The lightweight bellows 26 takes the high-frequency ripples of the flow and pressure while the more massive piston 5 moves uniformly or does not move. This ensures integrity of the seals 24 of the piston 5 and high degree of ripple smoothing.

In the receiver in FIG. 10 the cells 9 in the form of the honeycomb structure formed by the aggregate of partitions 17 surround the lightened housings 2 of three accumulators 1 and together with the outer shell serve a common housing for these accumulators. In such embodiment an additional light insulating housing in the form of a metal sleeve 22 is sufficient for accumulators 1 with piston separators 5 like in the embodiment in FIG. 9 while the accumulators with membrane or cylinder separators can be placed directly in the cavities inside the honeycomb structure. The proposed configuration allows placement of any required number of accumulators inside the honeycomb structure of the cells.

In the fluid power systems comprising accumulators on the low pressure side as well (for example, in hydraulic hybrid vehicles) it is preferable to apply an integral configuration shown in FIG. 11. The device in FIG. 11 includes two high pressure accumulators 1 and five low pressure accumulators 31. The high pressure accumulators 1 are surrounded by two layers of smaller size cells 9, which ensures increased strength of the housings of the accumulators 1. The smaller size cells 9 form the high pressure receiver 32 connected with the high pressure accumulators 1 while the larger cells 33 form the low pressure receiver 34 connected with the low pressure accumulators 31 (for simplicity these connections are not shown in FIG. 11). The low pressure accumulators 31 are located on the side of the most probable destructive impact upon the device, for example, from the outside relative to the chassis of the hydraulic hybrid vehicle while the high pressure accumulators 1 and the high pressure receiver 32 are located on the most protected side of the device, for example, on the side of the chassis of the hydraulic hybrid vehicle. The proposed configuration ensures even greater safety protecting the high pressure receiver and accumulators from destruction and considerably reducing the power of the gas jet in case of the damaged outer shell. It also allows creation of devices with any required number of high and low pressure accumulators, of any required volume of the receiver united into one unit of the required geometric shape, which facilitates integration of the device into various assemblies, including trucks and motor cars.

The embodiments described above are examples of embodiment of the main idea of the present invention that also presupposes a lot of other embodiments that are not given here in detail and including, for example, several accumulators and receivers connected by a set of gas lines and equipped with a set of emergency valves with the possibility of disconnecting the damaged accumulators and groups of cells of receivers as well as various embodiments of emergency valves in the receiver or in the accumulator.

Thus, the proposed solutions allow creation of a device for fluid power recuperation with the following properties:

reduced heat losses and increased efficiency of fluid power recuperation;

reduced kinetic energy of the gas that can be discharged in case of destruction of the outer walls of the device;

preserved performance of the device in case of partial destruction of its outer walls;

flexibility in choosing the external shape of the receiver.

LIST OF REFERENCE

1—L. S. Stolbov, A. D. Pterova, O. V. Lozhkin. Fundamentals of hydraulics and hydraulic drive of machines. Moscow, Mashinostroenie, 1988, p. 172
2—U.S. Pat. No. 6,405,760
3—H. Exner, R. Freitag, Dr. H. Gais, R. Lang, Y. Oppoltser, P. Shwab, E. Zumpf, U. Ostendorff, M. Ryke. Hydraulic drive. Fundamentals and components. 2nd Russian edition. Bosch Rexport AG Service Automation Didactics Erbach Germany, 2003, p. 156

The invention claimed is:

1. A device for fluid power recuperation comprising at least one hydropneumatic accumulator containing in its housing a fluid port communicating with the fluid reservoir of the accumulator separated by a movable separator from the gas reservoir of the accumulator that communicates via a gas port with at least one gas receiver, wherein the receiver is made as an aggregate of cells communicating with the gas port of the accumulator, while the ratio between the receiver volume and the area of internal surfaces of the cells does not exceed 10 mm and the said gas receiver has an outer shell containing an aggregate of partitions dividing the interior volume of the receiver into the aggregate of the cells in the form of thin tubes, so that the total thermal capacity of the partitions exceeds the gas thermal capacity at the maximum working pressure.

2. The device according to claim 1 wherein the cells have voracity elements allowing to increase gas flow turbulence in the cells.

3. The device according to claim 1 wherein the hydropneumatic accumulator includes a compressible regenerator in the gas reservoir allowing to decrease the distance between the heat exchange surfaces at the volume of the gas reservoir decrease and to increase the distance at the volume increase, while the average distance between the neighbouring heat exchange surfaces of the regenerator does not exceed 10 mm at the maximum volume of the gas reservoir.

4. The device according to claim 3 wherein the compressible regenerator in the accumulator is made from a flexible porous material and includes a filter allowing gas to pass from the gas reservoir of the accumulator into the receiver and entrapping the porous material, while the regenerator is made with increased gas permeability near the gas port of the accumulator.

5. The device according to claim 3 wherein the compressible regenerator of the accumulator is made from leaf metal elements located transversely to the direction of the separator movement and dividing the gas reservoir into intercommunicating gas layers of variable depth, while the leaf elements of the regenerator are kinematically connected with the separator allowing to increase the depth of the gas layers separated by them at the gas reservoir volume increase and to decrease the depth of said gas layers at the gas reservoir volume decrease.

6. The device according to claim 1 wherein the outer shell of the gas receiver is made so that to withstand the maximum pressure in the receiver while the aggregate of the partitions are made from springing metal or polymer elements allowing their insertion into the outer shell of the receiver.

7. The device according to claim 1 wherein the aggregate of the cells of the gas receiver are made in the form of a honeycomb structure where the partitions are connected with one another and with the outer shell of the receiver allowing to balance the gas pressure forces by the sum of the elastic stretching strain forces of the outer shell and partitions connected to it.

8. The device according to claim 7 wherein the partitions of the cells adjacent to the outer shell of the gas receiver are made so that they withstand without destruction the pressure drop arising in case of instantaneous seal failure of the receiver outer shell or neighboring cells.

9. The device according to claim 2 or 8 wherein the cells of the gas receiver have flow restriction elements restricting the gas flow at pressure drops on them being above the chosen level exceeding the pressure drop at the maximum working rate of gas exchange between the accumulator and the receiver at least 10 times.

10. The device according to claim 8 wherein it includes at least one emergency valve allowing to separate at least one cell from the remaining device at the pressure drop on said valve exceeding the set level preferably chosen in the range from 0.03 to 0.3 of the maximum gas pressure in the device.

11. The device according to claim 10 wherein the gas port of the accumulator is connected with the receiver cells via a gas line, the receiver port and the receiver collector, while the emergency valves allow to separate the gas line from the gas port of the accumulator and from the receiver collector at the pressure drop on said valves exceeding the set level preferably chosen in the range from 0.03 to 0.3 of the maximum gas pressure in the device.

12. The device according to claim 7 wherein the gas receiver made in the form of a honeycomb structure contains inside at least one hydropneumatic accumulator, so that the receiver is the housing for the accumulator.

13. The device according to claim 12 wherein the hydropneumatic accumulator has a piston separator having a sliding insulating contact with a thin-walled metal sleeve placed inside the housing made in the form of the honeycomb receiver, while the metal sleeve is connected with the receiver outside the zone of said sliding insulating contact.

14. The device according to claim 12 wherein it includes at least one high pressure hydropneumatic accumulator connected with the cells of the high pressure receiver and at least one low pressure accumulator connected with the cells of the low pressure receiver, wherein the high pressure accumulator is located inside the high pressure receiver located, in its turn, inside the low pressure receiver.

15. A device for fluid power recuperation comprising at least one hydropneumatic accumulator containing in its housing a fluid port communicating with the fluid reservoir of the accumulator separated by a movable separator from the gas reservoir of the accumulator that communicates via a gas port with at least one gas receiver, wherein the receiver is made as an aggregate of cells communicating with the gas port of the accumulator, while the ratio between the receiver volume and the area of internal surfaces of the cells does not exceed 10 mm and the said gas receiver has an outer shell containing an aggregate of partitions dividing the interior volume of the receiver into the aggregate of the cells in the form of thin tubes, so that the total thermal capacity of the partitions exceeds the gas thermal capacity at the maximum working pressure and is not less than 100 kJ/K/m3 while the aggregate of the partitions are made from springing metal or polymer elements allowing their insertion into the outer shell of the receiver.

16. The device according to claim 15 wherein the cells have voracity elements allowing to increase gas flow turbulence in the cells.

17. The device according to claim 15 wherein the hydropneumatic accumulator includes a compressible regenerator in the gas reservoir allowing to decrease the distance between the heat exchange surfaces at the volume of the gas reservoir decrease and to increase the distance at the volume increase, while the average distance between the neighbouring heat exchange surfaces of the regenerator does not exceed 10 mm at the maximum volume of the gas reservoir.

18. The device according to claim 17 wherein the compressible regenerator in the accumulator is made from a flexible porous material and includes a filter allowing gas to pass from the gas reservoir of the accumulator into the receiver and entrapping the porous material, while the regenerator is made with increased gas permeability near the gas port of the accumulator.

19. The device according to claim 17 wherein the compressible regenerator of the accumulator is made from leaf metal elements located transversely to the direction of the separator movement and dividing the gas reservoir into intercommunicating gas layers of variable depth, while the leaf elements of the regenerator are kinematically connected with the separator allowing to increase the depth of the gas layers separated by them at the gas reservoir volume increase and to decrease the depth of said gas layers at the gas reservoir volume decrease.

20. The device according to claims 16 wherein the cells of the gas receiver have flow restriction elements restricting the gas flow at pressure drops on them being above the chosen level exceeding the pressure drop at the maximum working rate of gas exchange between the accumulator and the receiver at least 10 times.

21. The device according to claim 15 wherein the gas receiver contains inside at least one hydropneumatic accumulator, so that the receiver is the housing for the accumulator.

22. The device according to claim 21 wherein the hydropneumatic accumulator has a piston separator having a sliding insulating contact with a thin-walled metal sleeve placed inside the receiver, while the metal sleeve is connected with the receiver outside the zone of said sliding insulating contact.

* * * * *